Feb. 19, 1957   G. GÖBEL   2,781,978
TEMPERATURE REGULATOR FOR ROOM HEATING
Filed July 10, 1952   2 Sheets-Sheet 1

INVENTOR
Gerhard Göbel
by Armand E. Western
Attorney

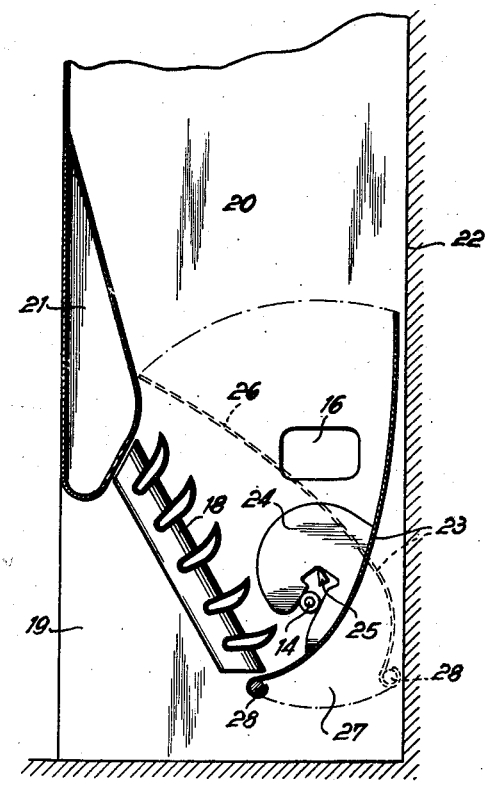

United States Patent Office 2,781,978
Patented Feb. 19, 1957

2,781,978

TEMPERATURE REGULATOR FOR ROOM HEATING

Gerhard Göbel, Hamburg-Wellingbuttel, Germany

Application July 10, 1952, Serial No. 298,169

4 Claims. (Cl. 236—38)

This invention relates to a device for automatically regulating the temperature of heated rooms.

More particularly the invention relates to a device of this kind which makes it possible to arrange the entire regulating device directly on the heater or on the valve of the heating medium.

The new device is intended to be used preferably in connection with hot heating media, such as steam or hot water.

The known automatic regulating devices for heating media (as distinguished from heaters operated by electricity, gas, or oil) are arranged in such a way that the sensitive element responsive to the room temperature is placed outside of the sphere of influence of the high-temperature heating element, or of the pipes carrying the hot heating medium. The sensitive element in such cases controls the regulating device proper from a remote point via intermediate means such as pneumatic or electric devices. Such an installation is rather intricate and expensive and is therefore seldom used for controlling a single heater.

It is an object of the invention to avoid these drawbacks and to provide a simple and inexpensive regulating device. This is performed by arranging the casing of the regulating device, which contains the temperature sensitive element, directly on the controlling device for the heating medium or directly on the heater and by continuously sucking in, through the casing, room air which has not been influenced by the hot heating element, so that the sensitive element is held, by this air, at room temperature.

In the device according to the invention, the casing is well insulated against heat transfer at its point of attachment to the regulating device or heater, or the casing may be made of heat-insulating material such as temperature-resisting plastic. Inside of this casing, the sensitive element is surrounded by a second casing which acts at the same time as an operating lever and as a guide for the air. The casing of the regulating device, as well as the second casing surrounding the sensitive element, are held approximately at room temperature by the air sucked in through the casings, so that any influence to the sensitive element by the high temperature of the heating medium is practically eliminated.

The room air is sucked through the casing of the regulating device by the well known chimney effect, in particular by connecting the casing to the stack of a convector or to an individual auxiliary stack which may be heated.

The invention is described by way of example in the accompanying drawing, in which Fig. 1 is a sectional view of a temperature regulator suitable to be built onto a convector heater and for operating a throttling flap;

Fig. 3 is a diagram illustrating the regulation of a convector by means of a throttling flap arranged in the lower part of a stack;

Figure 1:
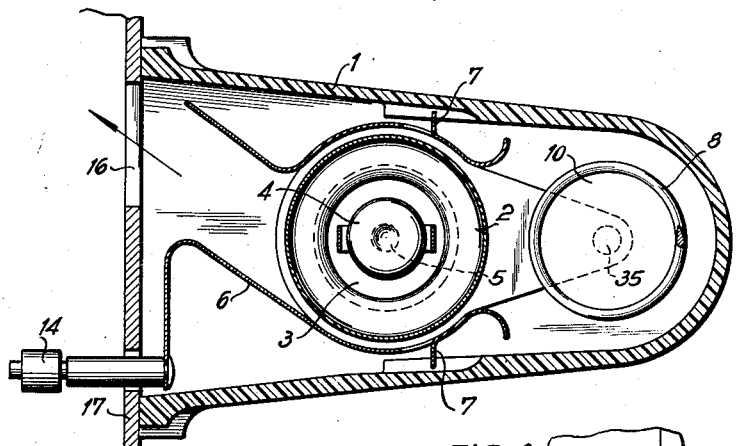
Figure 4:
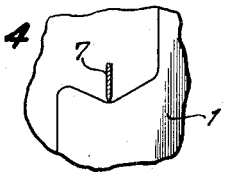
Fig. 4 shows a detail of the temperature regulator.

In the drawing, numeral 1 designates the plastic casing of the temperature regulator; 2 is the temperature-sensitive element, shown by way of example as a corrugated metal bellows; 3 is the cone-shaped bottom of this bellows which is rounded at the apex of the cone, and 4 is an internally arranged stop which limits the stroke of the bellows. The bellows 2 is filled with a volatile fluid, so that it will expand as the temperature increases. The rounded cones, forming the bottoms of said bellows, are held by points 5, having a suitable radius to insure friction-free action by rolling movement rather than sliding movement. One of these points, which may be made of plastic, is screwed into the casing 1; the other point is part of an operating lever 6 which also acts as a second casing for avoiding heat radiation and for guiding the air. The lever 6 is pivoted on fulcrum knife edges 7 on the casing 1 (see Figs. 2 and 4) and is acted upon by a regulating spring 8 via a conical washer 10 and a rounded point 35; the other end of this spring is supported by a sleeve 9 which is screwed by means of a multiple thread 12 into the part 11 of casing 1. This sleeve 9 serves to adjust the spring 8 to a tension corresponding to the desired temperature and at the same time forms a guide for the room air entering at 13. On the other end of lever 6, a roller 14 is provided, which actuates the throttling flap.

The regulating device is attached to the side wall 17 of the convector heater. An opening 16 in this wall admits air from the casing 1 into the stack of the convector and effects the sucking of room air from opening 13 over the heat sensitive element 2, so that the latter is kept practically at room temperature.

In Fig. 3, 20 designates the convector stack into which cool room air enters at 19 to pass over the element 18, which is kept at high temperature by the heating medium, and to flow upwards if the throttling flap 23 is in the open position shown in solid lines; 21 is the front wall and 22 the rear wall of the convector. Flap 23 has lateral hanging wings 24 pivoted on knife-edge fulcrums 25. One of these wings has a slot to receive the operating roller 14 at the end of lever 6. The flap 23 is provided with a counterweight 28 at its lower edge, so balanced that the fulcrums 25 are approximately at the center of gravity of the flap 23.

In operation, as soon as the room air circulating over the heat-sensitive element 2 reaches a predetermined temperature, according to the adjustment of the sleeve 9, the bellows 2 expands and the roller 14 moves horizontally to the right in Fig. 3. This causes the throttling flap 23 to swing over to the position shown in dotted lines in Fig. 3, shutting off the air circulation through the stack 20 and opening the auxiliary air intake 27 at the bottom. The heating action is thus reduced until the room temperature drops, the bellows 2 contracts and the flap 23 is opened by action in reverse to the movement described above.

Several modifications are possible without departing from the spirit of the invention and scope of the claims. The temperature-sensitive element may operate, over a linkage, a valve regulating the flow of the heating medium instead of the flow of air, as shown above, by means of a flap in the stack of a convector-type heater. The heat-sensitive element may be a bimetal-spring instead of a bellows filled with a volatile liquid. Such a bellows, which acts like a spring having a tension variable with the temperature, is preferred and according to the invention such a bellows is made extremely sensitive to small temperature changes. The usual bellows having small physical dimensions are not responsive enough to the small temperature changes which should operate a satisfactory room heating regulator.

Figure 2:
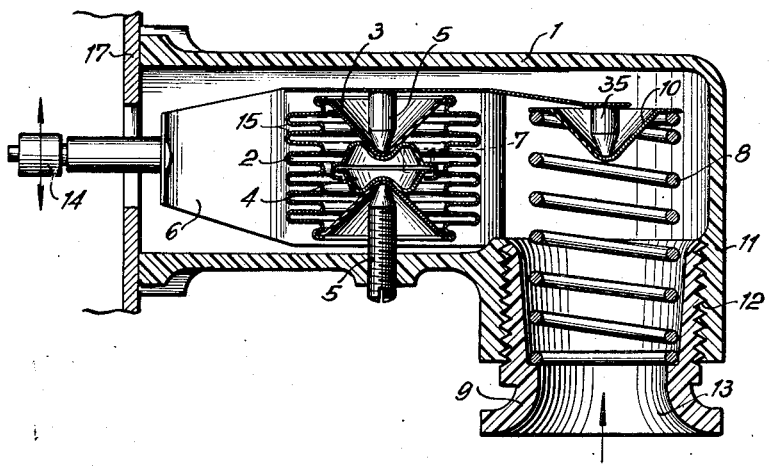
Fig. 2 is a section at right angles to the section of Fig. 1 through the same temperature regulator.

In order to obtain great sensitivity, the bellows is made with extremely thin walls and the corrugations are, as shown at 15 in Fig. 2, all in planes parallel to each other and perpendicular to the axis of the bellows. It can be seen that the stiffness of a metal bellows increases as the corrugations assume the shape of cones. According to the invention, the bellows operates over a small stroke around a practically resistance-free equilibrium position. The limitation of the stroke is obtained by stops arranged outside, or, as shown in Fig. 2, inside of the bellows. These stops 4 protect the thin-walled bellows against permanent deformation, especially when removed from its linkage.

In order to obtain a simplified assembly, friction free fulcrum points and a safeguard against buckling in case strong forces act upon the metal bellows, the bottoms of the bellows are of conical shape, extending toward the inside of the bellows, as shown in Fig. 2. The apex of each cone is well rounded, and co-operates with rounded fulcrum points which may be made of plastic and which have a radius that ensures within the working stroke a friction-free rolling movement rather than a sliding movement. All the other bearings and fulcrum points of the regulating device are likewise made in the shape of point-edge or knife-edge bearings, and all bearings are preloaded by the tension of the regulating spring and the temperature-sensitive element, which results in a very simple assembly.

What I claim is:

1. In a temperature regulator for room heaters with a convector-type heating element, wherein said temperature regulator comprises a casing enclosing a temperature-sensitive element and having an inlet opening and an outlet opening, with said opening being capable of drawing-in room air, which is not influenced by the room heater, but which is capable of affecting the temperature-sensitive element, in combination a spring counteracting said temperature-sensitive element, a lever operably connected to said temperature-sensitive element and to said spring, a throttle flap connected to said lever for controlling the heating in said room, and a hollow nut screwed into said casing of the temperature regulator abutting against said spring for adjusting the tension thereof, said nut having a bore serving as said inlet for the air sucked through the casing.

2. A temperature regulator according to claim 1, wherein the lever forms a second casing partly surrounding the temperature-sensitive element and serving as a guiding member for air passing through, and wherein the entire heat-conducting connections between the temperature-sensitive element and the outer casings are made by pivot points and knife-edge bearings.

3. In a temperature regulator for room heaters with a convector-type heating element, wherein said temperature regulator comprises a casing enclosing a temperature-sensitive element and having an inlet opening and an outlet opening, with said inlet opening being capable of drawing in room air which is not influenced by the room heater, but which is capable of affecting the temperature-sensitive element, the arrangement of the outlet opening of the casing closely above the heating element of the convector, which heating element is built into the bottom part of a vertical shaft; a corrugated metal bellows in the temperature-sensitive element, said metal bellows having very thin walls and corrugations exactly plane and parallel to each other, stops at the inside and outside of said bellows for constraining its stroke at both sides so that only a small deviation from the parallel position is possible, bottoms in said bellows formed with cone-shaped recesses with rounded apices, and means in the temperature-sensitive element for engaging said apices centrally and with a friction-free, rolling movement said means being formed with rounded points, corresponding with the said cone-shaped recesses in said bellows.

4. In a temperature regulator for room heaters with a convector-type heating element, wherein said temperature regulator comprises a casing enclosing a temperature-sensitive element and having an inlet opening and an outlet opening, with said inlet opening being capable of drawing in room air which is not influenced by the room heater, but which is capable of affecting the temperature-sensitive element, the arrangement of the outlet opening of the casing closely above the heating element of the convector, which heating element is built into the bottom part of a vertical shaft; an air-throttling flap arranged closely above said heating element; a spring counteracting said temperature-sensitive element; a double-arm control lever forming a type of scale beam, a central pivot point and lateral pivots for supporting said lever one arm of said lever being operatively connected to the throttling flap in the shaft, one of the lateral pivots operatively connecting said lever with the temperature-sensitive element, and another lateral pivot operatively connecting said lever with said spring, and means for adjusting the tension of the spring according to the desired room temperature.

References Cited in the file of this patent

UNITED STATES PATENTS

| | | |
|---|---|---|
| 894,947 | Fulton | Aug. 4, 1906 |
| 998,767 | Fulton | July 25, 1911 |
| 1,133,090 | Broomell | Mar. 23, 1915 |
| 1,192,411 | Fulton | July 25, 1916 |
| 1,783,418 | Field | Dec. 2, 1930 |
| 2,006,534 | Bridges | July 2, 1935 |
| 2,068,626 | Clifford | Jan. 19, 1937 |
| 2,269,551 | Powell | Jan. 13, 1942 |
| 2,523,499 | Copping | Sept. 26, 1950 |